United States Patent [19]
Wang

[11] Patent Number: 6,137,666
[45] Date of Patent: Oct. 24, 2000

[54] HIGH SPEED, SELECTIVE PROTECTIVE RELAYS

[75] Inventor: Liancheng Wang, Emmaus, Pa.

[73] Assignee: ABB Power T&D Company Inc., Raleigh, N.C.

[21] Appl. No.: 09/234,548

[22] Filed: Jan. 21, 1999

[51] Int. Cl.[7] .................................................. H02H 3/18
[52] U.S. Cl. ............................ 361/80; 361/94; 361/93.7
[58] Field of Search ............................... 361/62, 65, 78, 361/80, 88.89, 93.1, 93.2, 94, 97; 340/664, 657, 660; 702/57, 58, 64; 700/286, 292, 293

[56] References Cited

U.S. PATENT DOCUMENTS

| | | | |
|---|---|---|---|
| 3,731,152 | 5/1973 | Rockefeller, Jr. .................. | 317/27 R |
| 4,321,681 | 3/1982 | Sackin et al. ....................... | 364/492 |
| 4,825,327 | 4/1989 | Alexander et al. ................. | 361/82 |
| 4,868,704 | 9/1989 | Cavero ................................ | 361/180 |
| 4,873,602 | 10/1989 | Wilkinson ........................... | 361/78 |
| 5,453,903 | 9/1995 | Chow .................................. | 361/79 |
| 5,576,618 | 11/1996 | Calero ................................. | 324/76.15 |
| 5,659,242 | 8/1997 | Calero ................................. | 324/76.82 |

*Primary Examiner*—Josie Ballato
*Assistant Examiner*—Kim Huynh
*Attorney, Agent, or Firm*—Woodcock Washburn Kurtz Mackiewicz & Norris LLP

[57] ABSTRACT

A protective relay receives current and voltage inputs, digitizes them and reduces the effects of high and low frequency noise. In the case of a distance relay, incorporated in the relay is a signal generator which generates "operate" and "restraint" sinusoidal signals. In the case of a current or voltage relay, operate is a digitized version of current (voltage) and restraint is a pre-specified constant. In all cases, a magnitude comparator, implemented using short (two sample) data window algorithms, compares the magnitude of the operate and restraint signals and outputs a trip condition signal. The trip condition output is limited to a finite number of values by a limiter system and sent to an adaptive trip counter system. The adaptive trip counter system employs trip counter processing, which determines whether a trip signal will be initiated, immediately or after a period of delay.

54 Claims, 8 Drawing Sheets

HIGH SPEED, SELECTIVE PROTECTIVE RELAYS

BACKGROUND OF THE INVENTION

This invention relates to protective relaying. More specifically, this invention relates to high speed, intelligent protective relays for use in protecting power transmission systems.

Alternating Current ("AC") power distribution systems are well known and have been in conventional use for decades. An AC power system functions to generate power and distribute it to consumers through high voltage transmission lines.

Typically, such AC power systems operate at normal, steady-state conditions with voltages and currents at or near their rated (i.e., acceptable tolerance) values. On occasion however, "fault" (e.g., short circuit) and other abnormal conditions do arise. During such conditions, the voltages in the faulted area, for example, may drop far below nominal values and the relevant line currents may rise to very high values.

In an effort to address this problem, AC power distribution systems conventionally include protective relays installed about various equipment components and elements of the power system. Such relays are capable of detecting and isolating fault conditions in defined areas of the system, and are also capable of disconnecting the area or equipment subject to fault. Protective relays conventionally accomplish this task via control of properly located circuit breakers.

Thus, the protective relays function to remove from service a faulty portion of the system while maintaining service continuity in the healthy part of the system. An additional benefit of protective relays is that they can isolate and provide an indication of the location of the fault. Thus, such relays can aid in future resolution of the fault causing condition.

Protective relays come in a variety of types. Distance relays, which use both current and voltage inputs and output a trip condition, are very popular devices for transmission line protection. Distance relays make trip decisions based on whether there is a fault in a pre-defined zone extending from the relay location. They can be implemented using systems which determine an apparent fault distance and explicitly compare it with a pre-defined distance setting, or by comparing two sinusoidal signals, implicitly making the same determination.

Current (or voltage) relays make trip decisions by comparing an incoming current (voltage) input with a pre-defined current (voltage) setting. In the case of over-current relays, the relay generally makes a trip decision based on whether current exceeds the pre-defined current tolerance. In the case of under-voltage relays, the relay generally makes a trip decision based on whether voltage is lower than a pre-defined voltage constant.

Despite the benefits of protective relays, many existing protective relays have performance characteristics which are sub-optimal for a variety of applications. For example, for distance relays, in order to find the apparent distance (or impedance) of the fault, the signal processors may conventionally perform a Discrete Fourier Transform (DFT) algorithm on current and voltage inputs to determine the current and voltage phasors. Performing the DFT transform, which usually involves signal sampling at numerous data points and the performance of multiple operations, can be slow. Thus, distance relays implementing the DFT algorithm may be unsuitable for ultra-high speed applications.

Another shortcoming of some conventional protective relays is that parameters affecting current and voltage fault values are not taken into account. As a result, a relay may make inaccurate trip decisions. For example, due to the energy storing elements in a power system, fault voltages and currents contain DC ("Direct Current") offset. DC offset is an exponentially decaying DC quantity which depends on the time constant of transmission lines. Although DC offset will tend to affect input parameters processed by conventional protective relays, relay signal processing may not take DC offset into account. Thus, these inaccurate inputs may cause conventional relays to overreach and lose security (i.e., initiate a trip decision sooner than is desirable).

A related problem with some conventional protective relays is that they exhibit limited selectivity properties. For example, conventional relay signal processing may not distinguish between faults well within the relay's zone of protection, on the one hand, and faults on or near the zone border on the other. Such relays may not be flexible enough to provide both operating speed when the fault is well within the zone reach and security when the fault is near the balance point.

SUMMARY OF THE INVENTION

Thus, what is needed is an optimally accurate and selective protective relay capable of high speed performance when warranted. The present invention provides such a relay.

Specifically, the present invention is directed to a relay, such as a distance relay or current and voltage relay, incorporating a magnitude comparator system which generates a trip condition output by comparing the magnitude of two signals: "operate" and "restraint." The magnitude comparator systems incorporate a novel, short (two sample) 90° phase shifter system which provides orthogonal versions of incoming operate and restraint signals. Compare U.S. Pat. No. 5,659,242 to Calero. Also, to ensure the accuracy of trip indication outputs, the magnitude comparator system of a current and voltage relay embodiment of the present invention incorporates a novel two sample DC offset removal system. The two sample systems incorporated in such embodiments of the present invention are particularly suited to high speed applications.

A relay practicing the present invention may also employ a novel adaptive trip counter system which processes trip indication outputs from the magnitude comparator system. The adaptive trip counter employs trip counter logic, disclosed herein, to distinguish between trip indications well within the relay protection zone and those closer to the border.

Thus, one benefit of the present invention is that it utilizes short (e.g., two sample) data window systems, thus making the relay suitable for high speed applications.

Another benefit of the present invention is that the magnitude comparator system may employ DC offset processing, thus improving the reliability of trip indication outputs from current and voltage relays.

Another benefit of the present invention is that its use of adaptive trip counter processing enables relatively intelligent, selective balance between security and speed.

Also, since the trip condition processing for distance and current and voltage relays is essentially analogous from a mathematical perspective, application of the present invention does not depend on relay type.

Further advantages and benefits of the present invention will become apparent upon review of the detailed description provided below.

DETAILED DESCRIPTION

Figure 1:
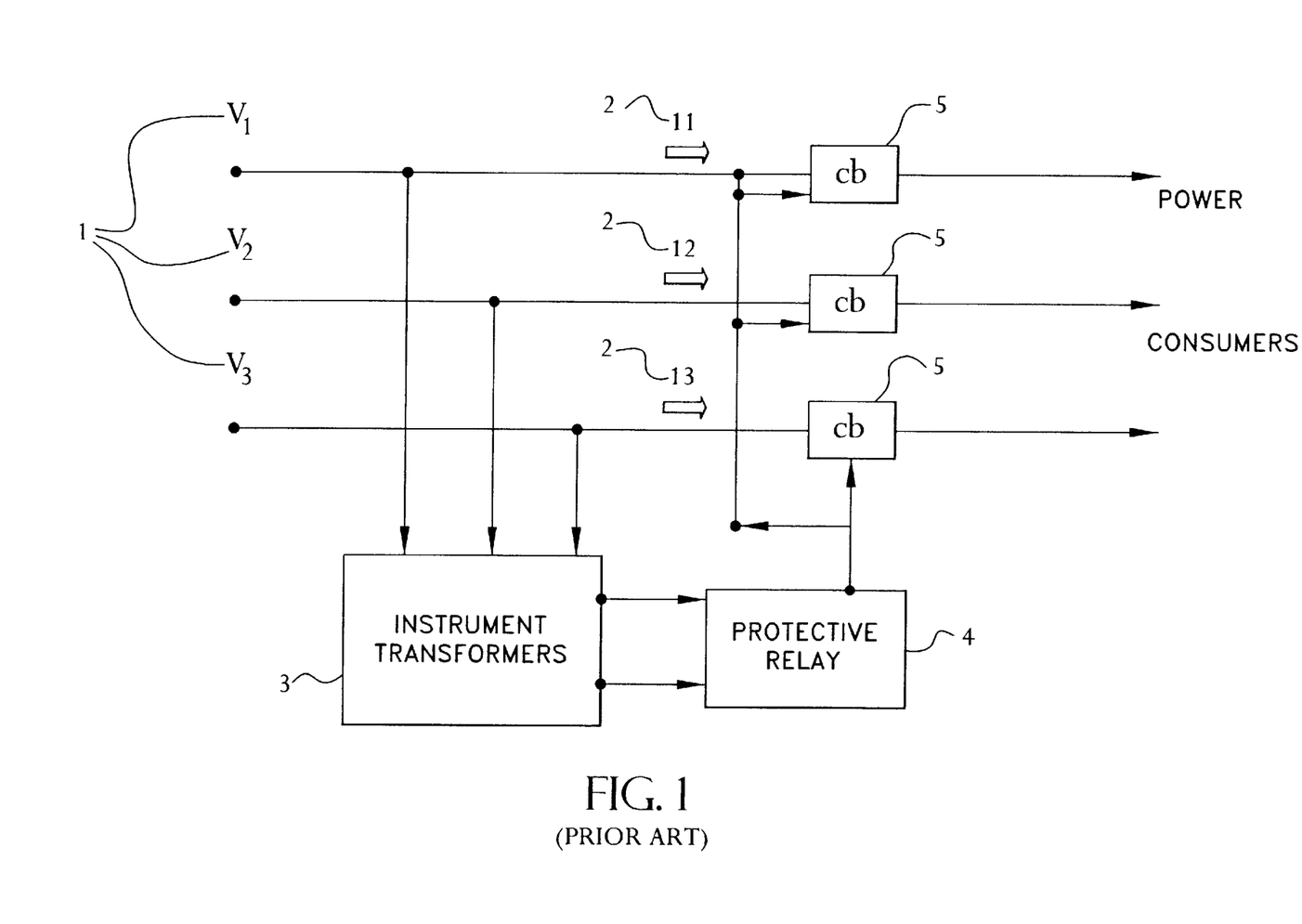
FIG. 1 is a high level representation depicting a portion of a conventional AC power transmission system which incorporates protective relaying.

FIG. 1 is a high level representation depicting a portion of a conventional AC power transmission system which incorporates protective relaying.

With respect to the present invention, instrument transformers 3 (i.e., voltage and current transformers) reduce primary high voltage 1 and current 2 signals to secondary lower voltages and currents, respectively. The transformers 3 also isolate the higher primary signals from the secondary system (i.e., in this case protective relays 4), thus preventing equipment damage.

A protective relay 4 receives as inputs one or both of the secondary voltage and current signals. The protective relay 4 processes these signals to determine whether a trip condition exists. The relay 4 signal processing may be implemented, for example, as logic instructions executed by conventional digital or analog circuitry.

Figure 2:
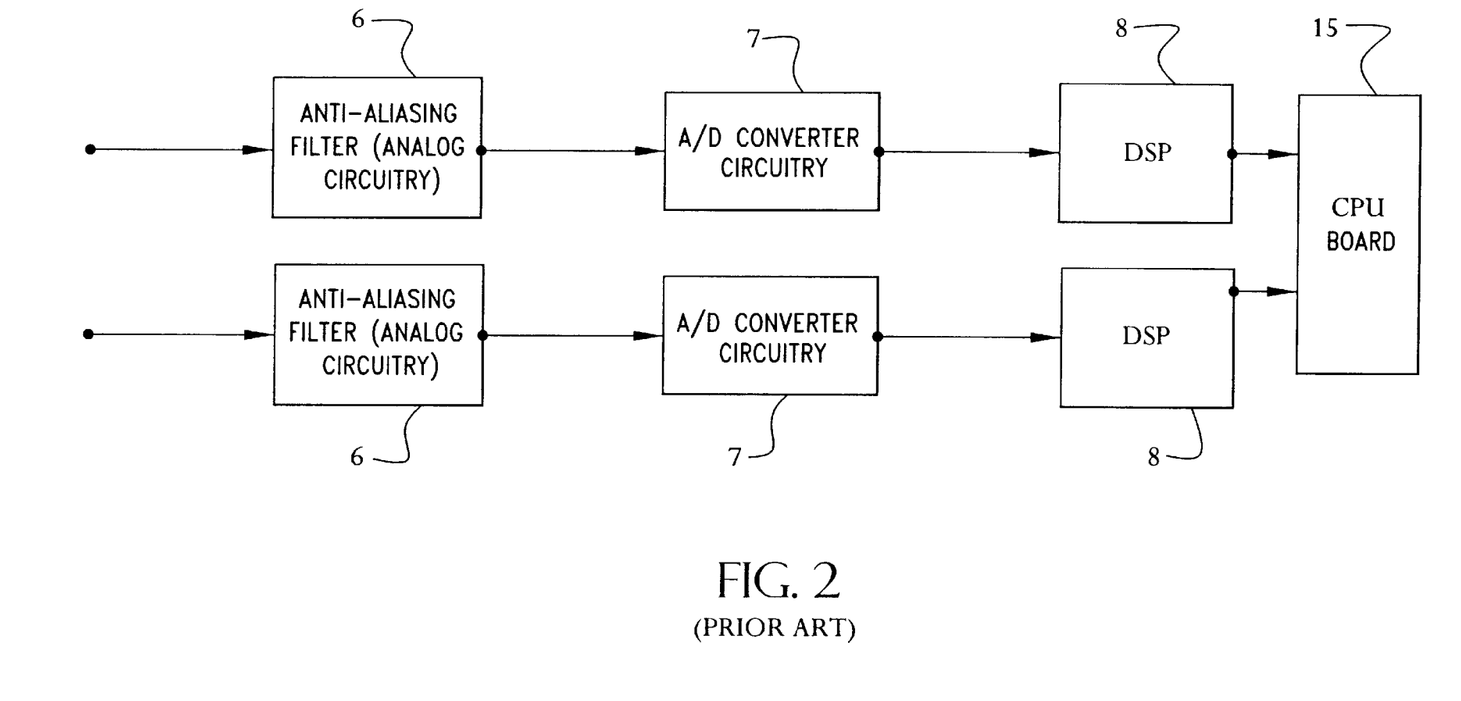
FIG. 2 is a high level depiction of conventional electrical circuitry which may be incorporated into a protective relay in accordance with one embodiment of the present invention.

FIG. 2 shows a high level depiction of such conventional electrical circuitry. As shown in FIG. 2, relay 4 signal processing may be implemented using conventional analog circuitry 6 for anti-aliasing filters, a conventional Analog/Digital ("A/D") Converter element 7, a Digital Signal Processor ("DSP") 8 and conventional CPU board 15.

Figure 3:
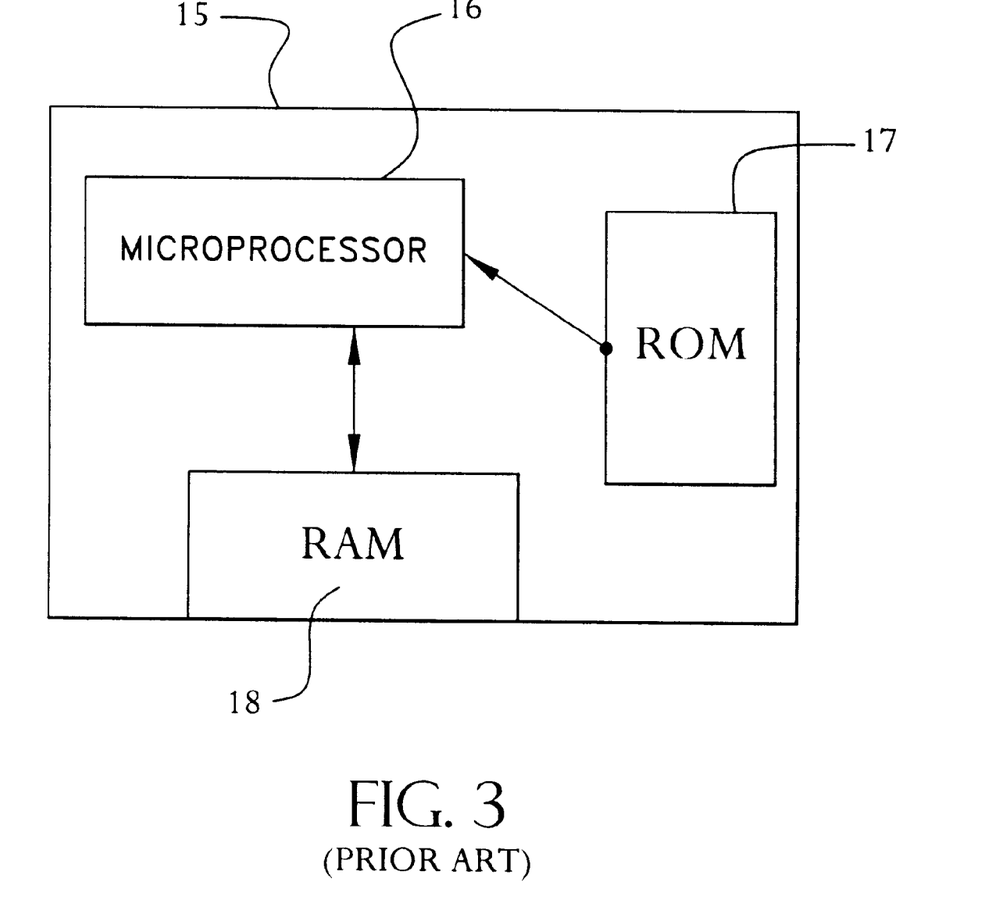
FIG. 3 is a more detailed depiction of the CPU board shown in FIG. 2.

FIG. 3 is a more detailed depiction of the CPU board 15 shown in FIG. 2. The CPU board 15 broadly encompasses a microprocessor 16, Read Only Memory ("ROM") 17 and Random Access Memory ("RAM") 18. The microprocessor 16 processes signal data (e.g., current and voltage parameters) stored in RAM 18 by executing signal processing instructions. The signal processing instructions, stored permanently in ROM 17, comprise signal processing systems whose output determines the existence of a trip condition.

Turning again to FIG. 1, once protective relay 4 processes determine the existence of a trip condition, the protective relay 4 signals the circuit breaker 5 to open a circuit. The circuit breaker 5 thus effects disconnection of the "zone of protection" when a fault occurs within the zone.

However, in order for such relay protection to operate as desired, the protective relay 4 signal processing systems (i.e., which a CPU board 15 or DSP 8 implement) must be designed to detect trip conditions correctly. For example, disconnecting a component where the fault occurs outside the component area is undesirable. Similarly undesirable is the failure to initiate a trip signal or the delay of a trip signal where a fault does occur well within the relay 4 protection zone. Thus, what is needed is a protective relay 4 incorporating sufficiently intelligent signal processing such that the relay 4 is capable of accurate, selective trip indications which, when warranted, are initiated at high speeds.

Figure 4:
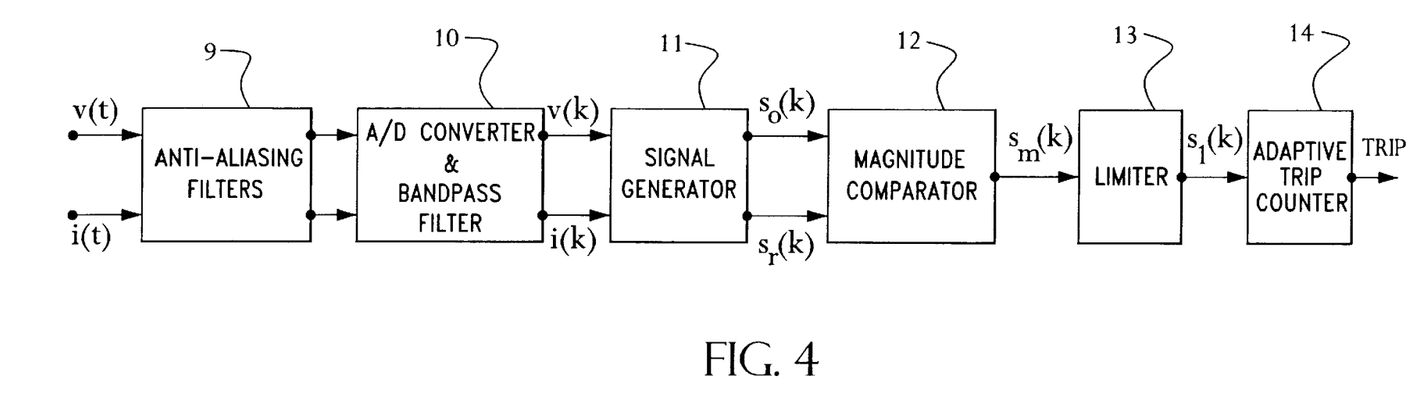
FIG. 4 is a high level depiction of signal processing system components incorporated into a protective distance relay in accordance with one embodiment of the present invention.

FIG. 4 is a high level depiction of signal processing system components incorporated into a protective distance relay 4 embodiment of the present invention. As noted earlier, the protective relay 4 uses the transformer 3 current (i(t)) and voltage (v(t)) output signals as inputs. These inputs are processed via a sequence of signal processing systems, implemented primarily on the CPU board 15.

The first in the system sequence, anti-aliasing filters 9, are well known to those of ordinary skill in the art. Anti-aliasing filters 9 function to reduce the effect of high frequency noise on a signal's fundamental frequency quantities. More specifically, anti-aliasing filters 9 eliminate higher frequency components of the input signals, i(t) and v(t), thus ensuring the signals are band-limited. Limiting the highest frequency component of the signals avoids aliasing distortions when the signals are later sampled, assuming a sufficient sampling rate. In the presently described embodiment, the anti-aliasing filters 9 are implemented using conventional, dedicated analog circuitry 6.

The Analog/Digital ("A/D") Converter and Band Pass filter component 10 uses as inputs the current and voltage signals which are outputs from the anti-aliasing filters 9. An A/D converter, which is also well known to those of ordinary skill in the art, functions to convert analog signals into digital signals. More specifically, the A/D converter first samples the current and voltage signals in accordance with a sampling rate sufficient to avoid aliasing. Next, the results are quantized and, using an appropriate coding scheme, the quantized signals are digitized. Thus, the anti-aliasing filter 9 analog current and voltage outputs become, respectively, digital current i(k) and voltage v(k) signals. The presently described A/D converter component can be implemented using conventionally available A/D converter circuitry 7.

Band pass filters, which filter out signal frequencies higher or lower than desired ranges, are also well known in the art. Here, digital band-pass filter element, which can be implemented using a DSP 8, function to reduce both high and low frequency noises.

The signal generator system 11 uses as inputs the digital current and voltage signals, i(k) and v(k), which are outputs of the A/D Converter and bandpass filter component 10. The signal generator system 11 processes the digital inputs and generates operate signal $s_o(k)$ and restraint signal $s_r(k)$ outputs. The operate and restraint signals can then be used to determine whether a fault is within the relay 4 zone of protection. The signal generator system 11 can be implemented on the CPU board 15.

A magnitude comparator system 12, which may be implemented on the CPU board 15, compares the operate and restraint signals and outputs a trip condition signal, $s_m(k)$. The operate and restrain signals are received from the signal generator system 11. The sign of $s_m(k)$ serves to indicate whether a fault is within the relay 4 protection zone.

The limiter system 13 outputs a trip condition indicator with a finite number of possible values which depend upon the trip condition signal ($s_m(k)$) output from the magnitude comparator system 12. The limited value outputs which the limiter system 13 generates represent respectively, for example, conditions where a fault is outside the protected zone, well within the protected zone or near a balance point. The limiter processing system 13 may be implemented on the CPU board 15.

Finally, an adaptive trip counter system 14 may send a trip signal to the circuit breaker 5 depending upon the output from the limiter system 13. The adaptive trip counter system 14 distinguishes between trip condition indicators by, for example, generating a trip signal immediately, generating a trip signal after some delay or failing to generate a trip signal. The adaptive trip counter system 14 may be implemented on the CPU board 15.

Figure 5:
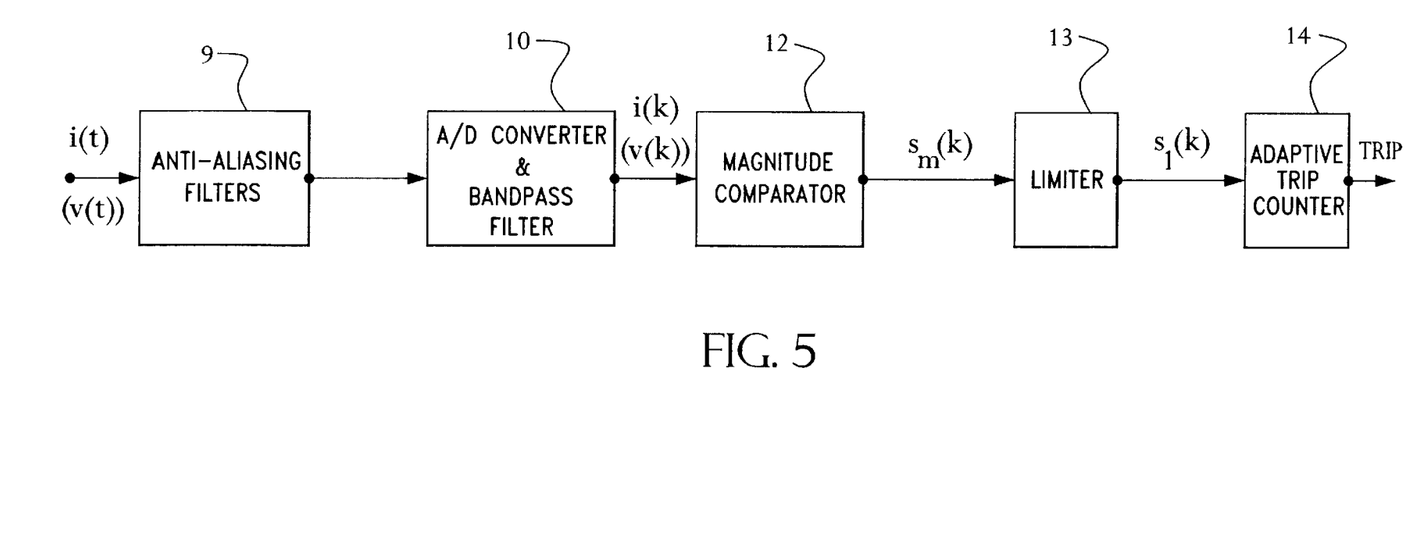
FIG. 5 is a high level depiction of signal processing system components incorporated into a protective current or voltage relay in accordance with another embodiment of the present invention.

While FIG. 4 is a high level depiction of signal processing components incorporated into a distance relay, the present invention may also be implemented as a current or voltage relay. Turning now to FIG. 5, it is a high level depiction of signal processing system components incorporated into a protective current or voltage relay 4 in accordance with one embodiment of the present invention. Again, the protective relay 4 uses the transformer 3 current (i(t)) or voltage (v(t)) output signals as an input. The input is processed via a sequence of signal processing systems, implemented primarily on the CPU board 15.

The first in the system sequence, the anti-aliasing filter 9, functions to reduce the effect of high frequency noise on the current (voltage) signal's fundamental frequency quantities.

The Analog/Digital ("A/D") Converter and Band Pass filter component 10 uses as input the current (voltage) signal which is output from the anti-aliasing filters 9. The A/D converter functions to convert analog signals into digital signals.

Next, band pass filters function to reduce both high and low frequency noises of the digital current (voltage) signal.

A magnitude comparator system 12, which may be implemented on the CPU board 15, compares operate and restraint signals and outputs a trip condition signal, $s_m(k)$. In the case of an over-current relay, the operate signal is digital current i(k) and restraint is a pre-specified threshold current. In the case of an under-voltage relay, the operate signal is digital voltage v(k) and restraint is a pre-specified threshold voltage. Again, the sign of $s_m(k)$ serves to indicate whether a fault is within the relay 4 protection zone.

The limiter system 13 outputs a trip condition indicator with a finite number of possible values which depend upon the trip condition signal ($s_m(k)$) output from the magnitude comparator system 12. The limited value outputs which the limiter system 13 generates represent respectively, for example, conditions where a fault is outside the protected zone, well within the protected zone or near a balance point. The limiter processing system 13 may be implemented on the CPU board 15.

Finally, an adaptive trip counter system 14 may send a trip signal to the circuit breaker 5 depending upon the output from the limiter system 13. The adaptive trip counter system 14 distinguishes between trip condition indicators by, for example, generating a trip signal immediately, generating a trip signal after some delay or failing to generate a trip signal. The adaptive trip counter system 14 may be implemented on the CPU board 15.

While a number of signal processing systems have thus far been discussed generally in connection with FIGS. 4 and 5, the present invention will be more fully understood from the more detailed description of these signal processing components set forth below.

As noted earlier, in accordance with distance relay as well as current and voltage embodiments of the present invention, analog current and/or voltage signals which instrument transformers 3 generate are passed though conventional anti-aliasing filters 9. Once so band-limited, a conventional A/D Converter and Bandpass filter system 10 processes the current and/or voltage signals to obtain digital current and/or voltage signals, i(k) and/or v(k).

In the a distance relay embodiment, the signal generator system 11 receives both these digital signals as inputs.

Figure 8:
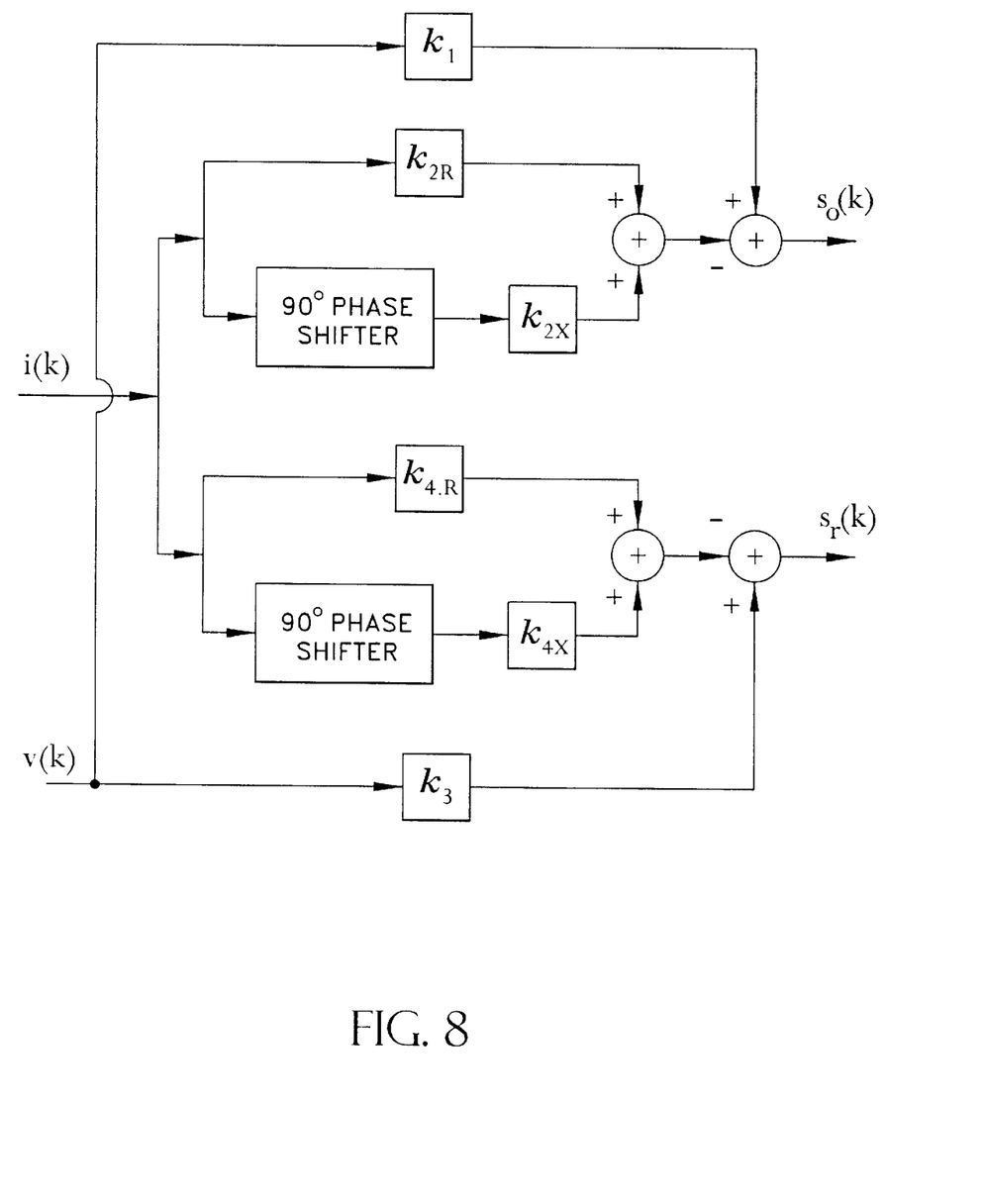
FIG. 8 shows a more detailed block diagram depiction of the signal generator system shown in FIG. 4.

Turning now to FIG. 8, it shows a more detailed block diagram depiction of the signal generator system component shown in FIG. 4. In a distance relay embodiment of the present invention, the signal generator system 11 processes the digital inputs and generates operate signal (k) and restraint signal $s_r(k)$ outputs. The operate and restraint signals are later compared to determine if a fault is within the relay 4 protection area.

More specifically, as shown in FIG. 8, the signal generator system 11 obtains an operate signal by: 1) applying a two-sample 90° phase shift on the sampled current input, i(k), and scaling the result by a constant, $K_{2,X}$; 2) adding to that product the product of i(k) and a second constant, $K_{2,R}$; and 3) subtracting the resulting sum from the product of the sampled voltage input, v(k), and a third constant, $K_1$.

Similarly, the restraint signal results from: 1) applying a two-sample 90° phase shift on the sampled current input, i(k), and scaling the result by a constant, $K_{4,X}$; 2) adding to that product the product of i(k) and a second constant, $K_{4,R}$; and 3) subtracting the resulting sum from the product of the sampled voltage input, v(k), and a third constant, $K_3$.

A description of the mathematical basis for these operations as well as their implications with respect to protective relay 4 characteristics follows.

In the continuous time domain, the operate and restraint signals can be described as follows:

$$s_o(t) = K_1 v(t) - K_{2,R} i(t) - K_{2,X} i_1(t) \quad \text{(Eq. 1a)}$$

$$s_r(t) = K_1 v(t) - K_{4,R} i(t) - K_{4,X} i_1(t) \quad \text{(Eq. 1b)}$$

where $s_o(t)$ and $s_r(k)$ represent the operate and restraint signals, respectively, v(t) and i(t) are voltage and current, respectively, $i_1(t)$ is a current orthogonal to i(t).

$K_1$, $K_{2,R}$, $K_{2,X}$, $K_3$, $K_{4,R}$, $K_{4,X}$ are constants.

The second term in both (Eq. 1a) and (Eq. 1b) represents the voltage drop by the current i(t) on a resistor, and the third term in both (Eq. 1a) and (Eq. 1b) represents the voltage drop by the current i(t) on an inductor. By choosing appropriate constants, different relay characteristics, such as mho, quadrilateral, or blinder, can be implemented. For example, if $K_1$ is equal to zero and $K_3$ be equal to 1.0, the resulting relay characteristic is a mho circle whose center is located at k2

($K_{4,R}$, $K_{4,X}$)

with its radius being equal to $$\sqrt{K_{2,R}^2 + K_{2,X}^2}$$

Similarly, if $K_1$ and $K_3$ are equal to 1, and $K_{4,R}$ and $K_{4,X}$ are zero, the resulting relay characteristic is a straight line which perpendicularly bisects the line segment originated from the origin to the point ($K_{2,R}$, $K_{2,X}$)

Applying the discrete two-sample 90° phase shifter to (Eq. 1a) and (Eq. 1b), the discrete time domain operate and restraint signals are derived. The operate and restraint signals in the discrete time domain are expressed as $$s_o(k)=K_1v(k)-K_{2,R}i(k)-K_{2,X}i(k) \quad \text{(Eq. 2a)}$$

$$s_r(k)=K_3v(k)-K_{4,R}i(k)-K_{4,X}i(k) \quad \text{(Eq. 2b)}$$

where $s_o(k)$ and $s_r(k)$ represent samples operate and restraint signals, respectively, and $v(k)$ and $i(k)$ represent voltage and current samples, respectively, $i_1(k)$ is the current orthogonal to $i(k)$.

Turning now to the magnitude comparator system 12 incorporated into distance (FIG. 4), as well as current and voltage (FIG. 5) relays, it generally functions to compare the magnitudes of the operate and restrain signals, $s_o(k)$ and $s_r(k)$. The magnitude comparator system 12 outputs a signal $s_m(k)$ which depends on the result of the comparison.

The value of $s_m(k)$ determines whether a trip signal is initiated. In particular, the sign of $s_m(k)$ indicates whether there is a fault within the relay 4 protection zone. A positive sign means that the fault is in the protected zone and a trip signal should be initiated, while a negative sign means that the fault is outside the relay 4 protection zone. In addition, the absolute value $|s_m(k)|$ indicates the fault distance from the zone boundary point. An absolute value of zero implies that the fault is at the zone boundary while a larger value implies the fault is closer to the relay location.

Figure 9:
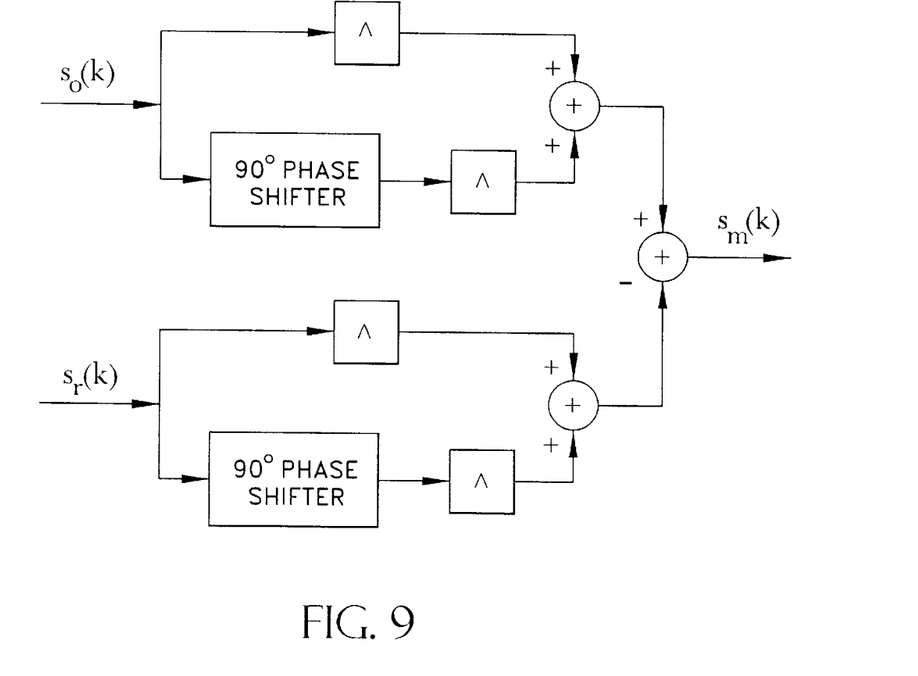
FIG. 9 shows a more detailed block diagram depiction of the magnitude comparator system shown in FIG. 4.

Turning now to FIG. 9, it shows, in accordance with a distance relay embodiment of the present invention, a more detailed block diagram depiction of the magnitude comparator system 12 component shown in FIG. 4.

As shown in FIG. 9, $s_m(k)$ is derived as follows: 1) compute the magnitude square of the restraint signal, $s_r(k)$, by applying a two-sample 90° phase shift on $s_r(k)$, squaring the result and adding the squared result to $s_r(k)$ squared; 2) compute the magnitude square of the operate signal, $s_o(k)$, by applying a two-sample 90° phase shift on $s_o(k)$, squaring the result and adding the squared result to $s_o(k)$ squared; and 3) subtract the magnitude square of the restraint signal from the magnitude square of the operate signal.

Expressed in algebraic terms, the magnitude square of the operate signal is calculated as $$s_o(k)^2+s_{o,1}(k)^2$$

the magnitude square of the restraint signal is calculated as $$s_r(k)^2+s_{r,1}(k)^2$$

and the output of the magnitude comparator, $s_m(k)$, is calculated as $$s_m(k)=[s_o(k)^2+s_{o,1}(k)^2]-[s_r(k)^2+s_{r,1}(k)^2] \quad \text{(Eq. 3)}$$

where $s_{o,1}(k)$ is orthogonal to $so(k)$, and $s_{r,1}(k)$ is orthogonal to $s_r(k)$.

Figure 10:
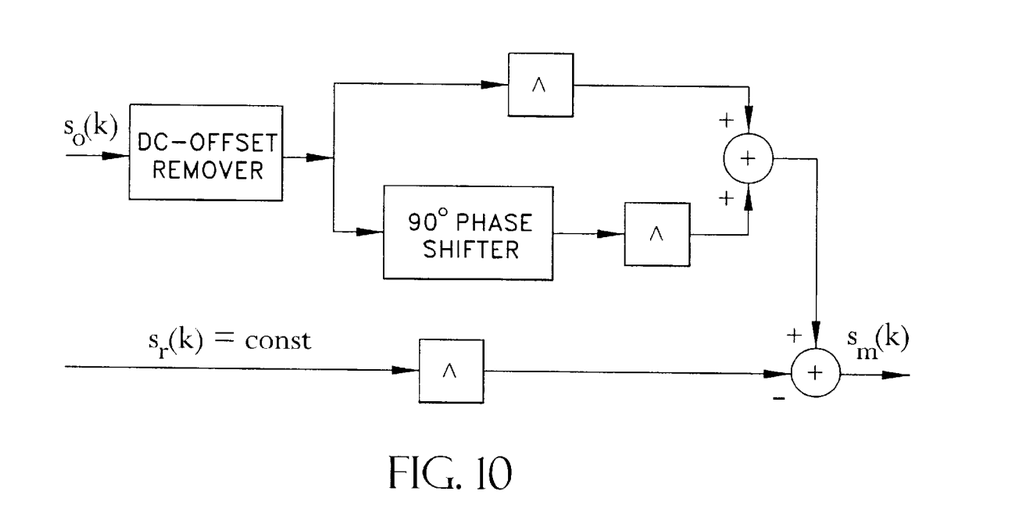
FIG. 10 shows a more detailed block diagram depiction of the magnitude comparator system shown in FIG. 5.

Turning now to FIG. 10, it shows, in accordance with a current or voltage embodiment of the present invention, a more detailed block diagram depiction of the magnitude comparator system 12 component shown in FIG. 5.

In the magnitude comparator system 12 for current and voltage relays, the operate signal (i.e., a digitized current or voltage signal) is compared with a restraint signal which is a pre-specified constant. Thus only the magnitude of the operate signal needs to be computed.

More specifically, as shown in FIG. 10, $s_m(k)$ is derived as follows: 1) square the restraint signal, $s_r(k)$; 2) apply a two sample DC offset remover to the operate signal, $s_o(k)$; 3) compute the magnitude square of the operate signal with dc offset applying a two-sample 90° phase shift, squaring the result and adding the squared sequence result to $s_o(k)$ (with DC offset) squared; and 4) subtract the restraint signal sequence squared from the magnitude square of the operate signal with DC offset.

As noted earlier, both distance as well as current and voltage relays may employ a limiter system 13. The limiter system 13 receives the trip condition signal $s_m(k)$ as input from the magnitude comparator system 12 and outputs a trip condition indicator with a finite number of possible values.

Figure 11:
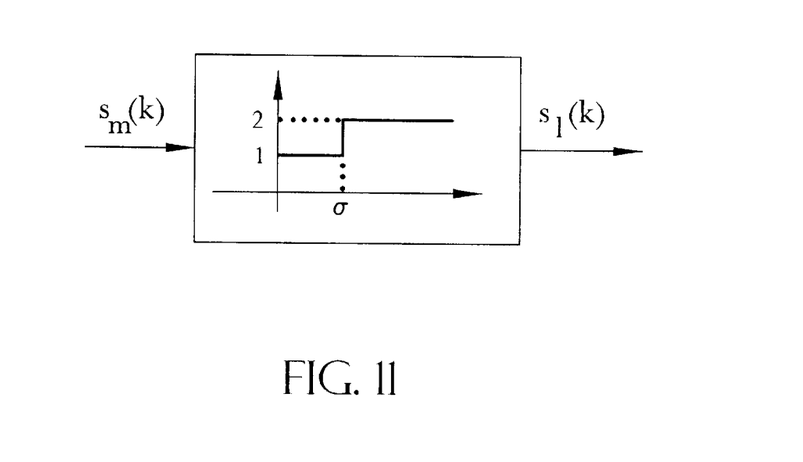
FIG. 11 shows a more detailed block diagram depiction of the limiter systems shown in FIGS. 4 and 5.

Turning now to FIG. 11, it shows a more detailed block diagram depiction of the limiter system 13 component shown in FIGS. 4 and 5. The limited output values of the sequence $s_1(k)$ which the limiter system 13 generates represent, respectively, conditions where no fault is within or near the protected zone, where a fault is well within the protected zone or when a fault is near a balance point. More particularly, in accordance with FIG. 11, these conditions correspond to three limiter 13 outputs: 0, 1, or 2. The limiter outputs also correspond, respectively, to negative $s_m(k)$, positive $s_m(k)$ smaller than a pre-specified constant, and positive $s_m(k)$ larger than the pre-specified constant. The pre-specified constant defines the fast operating region within the zone reach.

In functional terms, the limiter 13 output is described as $$s_1(k) = \begin{cases} 0. & s_m(k) \le 0 \\ 1. & 0 < s_m(k) \le \sigma \\ 2. & s_m(k) \ge \sigma \end{cases} \quad \text{(Eq. 4)}$$

where σ represents the pre-specified constant.

Figure 12:
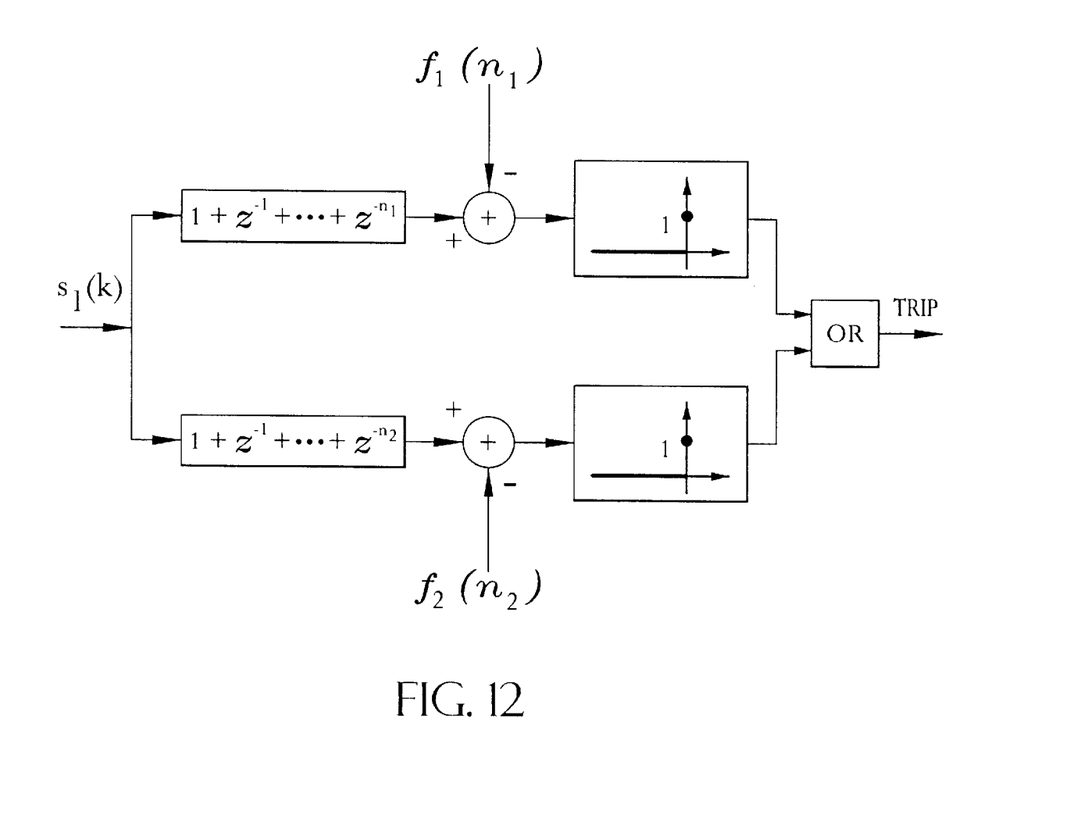
FIG. 12 shows a more detailed block diagram depiction of the adaptive trip counter system shown in FIGS. 4 and 5.

Finally, depending upon the output from the limiter system 13, the adaptive trip counter system 14 may send a trip signal to a circuit breaker 5. Turning now to FIG. 12, it shows block diagram depiction of the adaptive trip counter system 14 component shown in FIGS. 4 and 5. The adaptive trip counter 14 is a device for ensuring high relay operating speed when a fault is well within the zone reach and for ensuring security when a fault is near the balance point. The adaptive trip counter system 14 distinguishes between limiter 13 outputs by, for example, generating a trip signal immediately, generating a trip signal after some delay or failing to generate a trip signal.

More specifically, as shown in FIG. 12, the trip counter 14 includes two paths from its input to its output. One path counts the consecutive 2's in the limiter 13 output, and the other path counts both 1's and 2's over a specified period of time. In the first path, the trip counter 14 may be set such that a trip signal will be initiated if there are three or four consecutive 2's. In the second path, both 1's and 2's are counted over a specified period of time, for example one cycle, and a trip signal will be asserted if the total 1's and 2's are larger than a threshold.

In FIG. 12, $f_1(n_1)$ is a function of $n_1$, and $$f_1(n_1)=2(n_1+1) \quad \text{(Eq. 5)}$$

If three consecutive 2's is utilized as a trip criterion then $n_1$ will be equal to 2, and $f_1(n_1)$ will be equal to 6. Similarly, $f_2(n_2)$ is a function of $n_2$. If the sample number $n_2$ is selected to cover a whole cycle, $f_2(n_2)$ may be chosen as $(n_2+1)/2$.

As was disclosed in from the earlier description of the magnitude comparator 12 system, to find the magnitude of a sinusoidal signal, a corresponding orthogonal sinusoidal signal with the same magnitude is required. The magnitude comparator 12 system (FIGS. 9 and 10) incorporates a two-sample 90° phase shifter to derive the orthogonal sinusoid. In addition, in the signal generator system 11 for distance relays (FIG. 8), the 90° phase shifter is also applied to compute a voltage drop which is 90° ahead of current.

Figure 6:
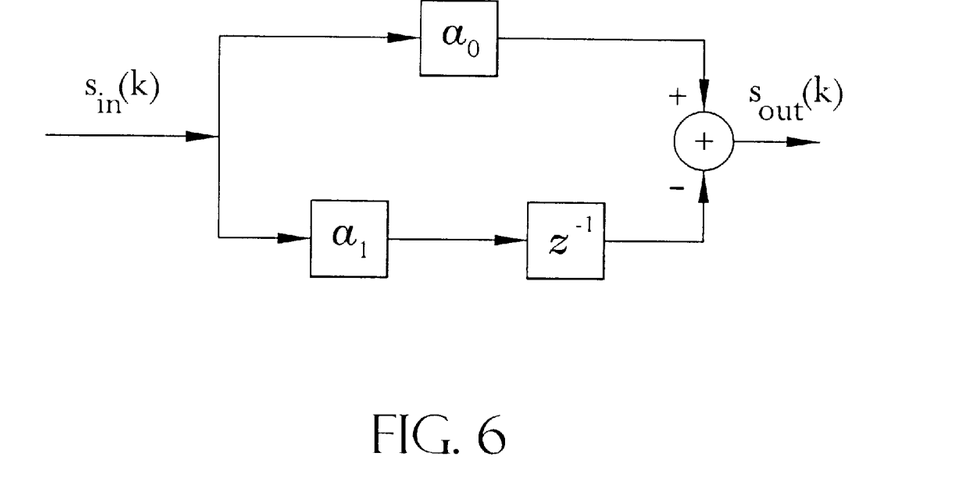
FIG. 6 is a block diagram depiction of a two-sample 90° phase shifter system incorporated into the signal generator system shown in FIG. 4 and the magnitude comparator systems shown in FIGS. 4 and 5.

Turning now to FIG. 6, it shows a block diagram depiction of a two-sample 90° phase shifter system incorporated into the signal generator 11 and magnitude comparator 12 systems. The 90° phase shifter processes an input signal $s_{in}(k)$ to derive the output signal $s_{out}(k)$. As is shown in FIG. 4, $s_{out}(k)$ is obtained by: 1) multiplying $s_{in}(k)$ by the constant $a_1$ and then applying a one sample delay element to the product sequence; and 2) subtracting the delayed product sequence result from the product sequence which results from scaling $s_{in}(k)$ by the constant $a_0$. A description of the mathematical basis for these operations as well as their implications with respect to protective relay 4 characteristics follows.

In the continuous time domain, the 90° phase shifter is actually a differentiator. For instance, if it is assumed that a sinusoidal signal is $$s(t)=A\sin(\omega t+\phi) \quad \text{(Eq. 6)}$$

The signal orthogonal to $s(t)$ can be derived by taking a derivative of $s(t)$ and dividing the resulting equation by its angular frequency:

$$s_\perp(t) = \frac{1}{\omega}\frac{ds(t)}{dt} = A\cos(\omega t + \Phi) \quad \text{(Eq. 7)}$$

where $s_1(t)$ is orthogonal to $s(t)$. It can be seen that both $s(t)$ and $s_1(t)$ have the same frequency and magnitude but $s_1(t)$ is 90 degrees ahead of $s(t)$. Based on (Eq. 6) and (Eq. 7), the magnitude of "A" $s(t)$ is computed as $$A=\sqrt{s(t)^2+s_1(t)^2} \quad \text{(Eq. 8)}$$

or $$A^2=s(t)^2+s_1(t)^2 \quad \text{(Eq. 9)}$$

From basic calculus theory, the differentiation in the continuous time domain is defined as $$\frac{ds(t)}{dt} = \lim_{T \to 0} \frac{s(k)-s(k-1)}{T} \quad \text{(Eq. 10)}$$

Thus, the 90° phase shifter in the continuous time domain can be described by using the sampled signal as $$\frac{1}{\omega}\frac{ds(t)}{dt} = \frac{1}{\omega}\lim_{T \to 0}\frac{s(k)-s(k-1)}{T} \quad \text{(Eq. 11)}$$

where T is the sampling period and k represents the kth sampling instant. According to (Eq. 11), a numerical 90° phase shifter in the discrete time domain may be defined based on the two-sample backward difference expression. The backward difference is equal to the differentiation only if the sampling period T is equal to zero. For a finite sampling period, there will be an error if the two-sample backward difference is used as a numerical 90° phase shifter. There also exist other candidates which may be selected as a numerical 90° phase shifter. These methods use more than two samples, and generally, can provide more accurate results. However, since they will inevitably introduce more time delay, they are not appropriate for high-speed relay designs.

It should be noted that the accuracy requirements for the numerical 90° phase shifter or differentiator in protective relaying applications are different from those in numerical analysis. There, the numerical differentiator should be able to approximate d/dt over a wide frequency range. In protective relay applications, it suffices to have a 90° phase shifter which provides an accurate result only for the fundamental power frequency signal. Its behavior with respect to signals other than fundamental frequency is not crucial so long as it does not amplify them inappropriately. This is because the non-fundamental frequency signals have already been taken care of by analog anti-aliasing filters 9 and digital band-pass filters 10. To this end, a two-sample 90° phase shifter is proposed and assumed as $$s_1(k)=a_0 s(k)-a_1 s(k-1) \quad \text{(Eq. 12)}$$

where $a_0$ and $a_1$ are constants and are determined in such a way that $s_1(k)$ and $s(k)$ are orthogonal to each other. To find the constants $a_0$ and $a_1$, take a z transform on both sides of (Eq. 12). The transfer function between $s_1(k)$ and $s(k)$ can be described as $$G(z) = \frac{S_\perp(z)}{S(z)} = a_0 - a_1 z^{-1} \quad \text{(Eq. 13)}$$

where $z^{-1}$ represents one sampling period time delay; $S(z)$ and $S_1(z)$ represent the z transform of $s(k)$ and $s_1(k)$, respectively. The ratio between the magnitudes of $s_1(k)$ and $s(k)$ can be described as $$|G(e^{j\omega T})|$$

and the angle difference between $s_1(k)$ and $s(k)$ can be described by $$\angle G(e^{j\omega T})$$

where $G(e^{j\omega T})$ is obtained by substituting $e^{j\omega T}$ for z in $G(z)$:

$$G(e^{j\omega T})=G(z)|_{z=e^{j\omega T}}=a_0-a_1\cos\omega T+ja_1\sin\omega T \quad \text{(Eq. 14)}$$

In order to get the signal $s_1(k)$ which is orthogonal to $s(k)$ under the fundamental power system frequency, the constants $a_0$ and $a_1$ have to satisfy the following expressions $$a_0-a_1\cos\omega T=0 \quad \text{(Eq. 15)}$$

$$a_1\sin\omega T=1 \quad \text{(Eq. 16)}$$

where $\omega_0$ represents the fundamental frequency. Solving (Eq. 15) and (Eq. 16), the two constants $a_0$ and $a_1$ are found as $$a_0 = \frac{1}{\tan\omega_0 T} \quad \text{(Eq. 17)}$$

$$a_1 = \frac{1}{\sin\omega_0 T} \quad \text{(Eq. 18)}$$

Apart from the two-sample 90° phase shifter, the magnitude comparator system 12 disclosed above for current and voltage relays (FIG. 10) also incorporates another subsystem: a novel two sample DC offset removal system. As noted above, due to energy storing elements in a power system, fault voltages and currents contain DC offset, an exponentially decaying dc quantity. The decaying speed of the DC offset depends on the line time constant. The DC offset must be removed from the measured currents and voltages. Otherwise, DC offset may cause the relay to overreach and lose security.

Figure 7:
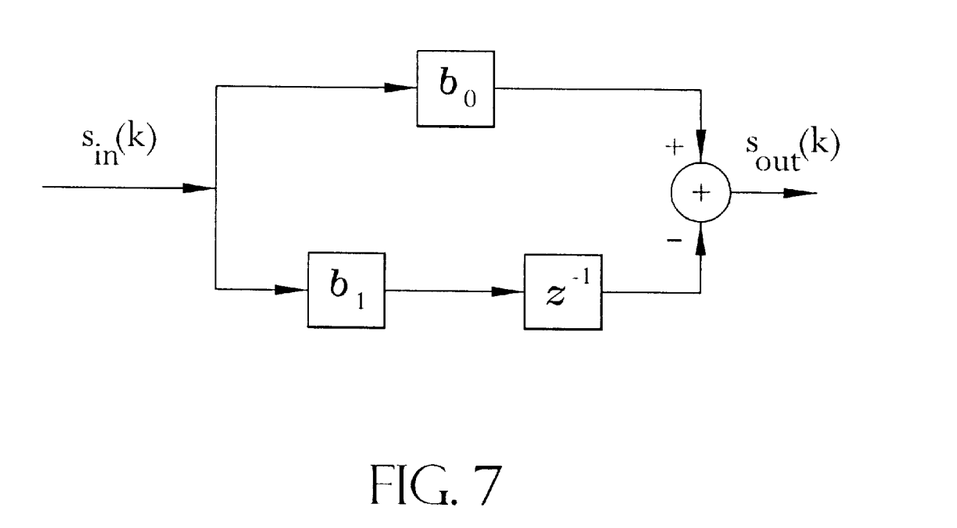
FIG. 7 is a block diagram depiction of a two-sample DC offset remover system incorporated into the magnitude comparator system shown in FIG. 5.

Turning now to FIG. 7, it shows a block diagram depiction of a two-sample DC offset remover system component incorporated into the magnitude comparator system component 12 shown in FIG. 10. The DC offset remover processes an input signal $s_{in}(k)$ to derive the output signal $s_{out}(k)$. As is shown in FIG. 7, $s_{out}(k)$ is obtained by: 1) multiplying $s_{in}(k)$ by the constant $b_1$ and then applying a one sample delay element to the product sequence; and 2) subtracting the delayed product sequence result from the product sequence which results from scaling $s_{in}(k)$ by the constant $b_0$. A description of the mathematical basis for these operations as well as their implications with respect to protective relay 4 characteristics follows.

The DC offset remover has the following transfer function $$G(z) = b_0 - b_1 z^{-1} \quad \text{(Eq. 19)}$$

where $b_0$ and $b_1$ are constants. Applying an exponential DC offset $$e - \frac{kT}{\tau}$$

to the two-sample DC offset remover, its output is found as $$e - \frac{kT}{\tau}\left(b_0 - b_1 e \frac{kT}{\tau}\right)$$

where $\tau$ is the time constant determined by line parameters. The constants $b_0$ and $b_1$ are selected as $$b_0 = \frac{1}{\sqrt{1 - 2e\frac{T}{\tau}\cos\omega_0 T + e - \frac{2T}{\tau}}} \quad \text{(Eq. 20)}$$

$$b_1 = \frac{1}{\sqrt{1 - 2e\frac{T}{\tau}\cos\omega_0 T + e + \frac{2T}{\tau}}} \quad \text{(Eq. 21)}$$

It can be verified that the DC offset remover can completely eliminate the DC offset while introducing no attenuation to the fundamental frequency quantities.

Finally, it will be readily apparent that while the above description details embodiments of the present invention, the present invention is by no means limited thereto. In fact, numerous variations and combinations of the described signal processing systems might be incorporated in a relay remaining within the scope of the invention.

What is claimed is:

1. A protective distance relay including signal processing circuitry, said protective relay capable of detecting abnormal line conditions in power transmission systems for the purpose of providing protection to said systems, said protective relay comprising:
   a. a signal generator processing system executed by said signal processing circuitry, said signal generator processing system determining an operate signal and a restraint signal by processing digitized versions of line current and voltage signals detected by the protective relay;
   b. a magnitude comparator processing system executed by said signal processing circuitry, said magnitude comparator system determining a trip condition signal by processing which includes comparing the magnitudes of said operate signal and said restraint signal, said trip condition signal representing the difference between said magnitudes; and
   c. a trip initiator system executed by said signal processing circuitry, said trip initiator system determining whether a trip command signal is initiated depending on the sign and magnitude of said trip condition signal.

2. The protective distance relay of claim 1 wherein the trip initiator system comprises a limiter system executed by said signal processing circuitry which limits the possible value of said trip condition signal and an adaptive trip counter system executed by said signal processing circuitry which determines whether said trip command signal is initiated depending upon said value of said trip condition signal.

3. The protective relay of claim 1 wherein said adaptive trip counter system also determines whether a trip command signal should be delayed depending upon said value of said trip condition signal.

4. The protective relay of claim 1 wherein said digitized line current and voltage signals are digitized by a Analog/Digital Converter system executed by said signal processing circuitry.

5. The protective relay of claim 4 wherein said line current and voltage signals are processed by an anti-aliasing filter processing system executed by said signal processing circuitry prior to processing by said Analog/Digital Converter system.

6. The protective relay of claim 5 wherein said digitized line current and voltage signals are processed by a Band pass filter system executed by said signal processing circuitry for eliminating undesirable frequency components of said digitized line current and voltage signal.

7. The protective relay of claim 1 wherein the signal generator processing system computes the operate signal by subtracting a sum from a scaled version of said digitized line voltage signal, said sum being a scaled version of said digitized line current signal added to a scaled version of a digitized signal orthogonal to said digitized line current signal.

8. The protective relay of claim 1 wherein the signal generator processing system computes the restraint signal by subtracting a sum from a scaled version of the digitized line voltage signal, said sum being a scaled version of said digitized line current signal added to a scaled version of a digitized signal orthogonal to said digitized line current signal.

9. The protective relay of claim 1 wherein said magnitude comparator processing system comparing the magnitudes of said operate signal and said restraint signal comprises subtracting the magnitude square of the restraint signal from the magnitude square of the operate signal.

10. The protective relay of claim 9 wherein the magnitude comparator processing system computes the magnitude square of said operate signal by adding a squared signal orthogonal to said operate signal to said operate signal squared.

11. The protective relay of claim 10 wherein said signal othogonal to said operate signal is computed by processing said operate signal with a 90° phase shifter system executed by said signal processing circuitry.

12. The protective relay of claim 9 wherein the magnitude comparator processing system computes the magnitude square of said restraint signal by adding a squared signal orthogonal to said restraint signal squared to said restraint signal squared.

13. The protective relay of claim 12 wherein said signal othogonal to said restraint signal is computed by processing said operate signal with a 90° phase shifter system executed by said signal processing circuitry.

14. The protective relay of claim 11 wherein said 90° phase shifter computes said signal orthogonal to said operate signal using as inputs only two samples of said operate signal.

15. The protective relay of claim 13 wherein said 90° phase shifter computes said signal orthogonal to said restraint signal using as inputs only two samples of said restraint signal.

16. The protective relay of claim 2 wherein said limiter system limits the possible value of said trip condition signal to three possible values.

17. The protective relay of claim 16 wherein the three possible values are 0, 1 and 2.

18. The protective relay of claim 1 wherein the signal processing circuitry includes a microprocessor.

19. The protective relay of claim 1 wherein the signal processing circuitry includes a commercially available DSP.

20. The protective relay of claim 1 wherein the signal processing circuitry includes an A/D converter.

21. The protective relay of claim 1 wherein the signal processing circuitry includes analog circuitry.

22. A protective relay including signal processing circuitry, said protective relay capable of detecting abnormal line conditions in power distribution systems for the purpose of providing protection to said systems, said protective relay comprising:
   a. a magnitude comparator processing system executed by said signal processing circuitry, said magnitude comparator system determining a trip condition signal by processing which includes comparing the magnitudes of an operate signal and a restraint signal, said trip condition signal representing the difference between said magnitudes; and
   b. a trip initiator system executed by said signal processing circuitry, said trip initiator system determining whether a trip command signal is initiated depending on the sign and magnitude of said trip condition signal.

23. The protective relay of claim 22 wherein said operate signal is a digitized version of a line input signal detected by said protective relay.

24. The protective relay of claim 23 wherein said digitized line input signal is digitized by a Analog/Digital Converter system executed by said signal processing circuitry.

25. The protective relay of claim 24 wherein said line input signal is processed by an anti-aliasing filter processing system executed by said signal processing circuitry prior to processing by said Analog/Digital Converter system.

26. The protective relay of claim 25 wherein said digitized line input signal is processed by a Band pass filter system executed by said signal processing circuitry for eliminating undesirable frequency components of said digitized line voltage signal.

27. The protective relay of claim 23 wherein said restraint signal is a pre-specified constant.

28. The protective relay of claim 27 wherein said magnitude comparator processing system includes a DC offset removal system executed by said signal processing circuitry which processes said operate signal such that any DC offset in said operate signal is eliminated.

29. The protective relay of claim 28 wherein said DC offset removal system processes said operate signal using only two samples of said operate signal.

30. The protective relay of claim 27 wherein said magnitude comparator processing system comparing the magnitudes of said operate signal and said restraint signal comprises subtracting the restraint signal squared from the magnitude square of said operate signal adjusted for DC offset.

31. The protective relay of claim 28 wherein the magnitude comparator processing system computes the magnitude square of said operate signal adjusted for DC offset by adding a squared signal orthogonal to said operate signal adjusted from DC offset to said operate signal adjusted for DC offset squared.

32. The protective relay of claim 31 wherein said signal orthogonal to said operate signal adjusted for DC offset is computed by processing said operate signal adjusted for DC offset with a 90° phase shifter system executed by said signal processing circuitry.

33. The protective relay of claim 32 wherein said 90° phase shifter computes said signal orthogonal to said operate signal adjusted for DC offset using as inputs only two samples of said operate signal adjusted for DC offset.

34. The protective relay of claim 30 wherein said operate signal is adjusted for DC offset by a DC offset removal system executed by the signal processing circuitry.

35. The protective relay of claim 34 wherein the DC offset removal system processes said operate signal using only two samples of said operate signal.

36. The protective relay of claim 22 wherein the trip initiator system comprises a limiter system executed by said signal processing circuitry which limits the possible value of said trip condition signal and an adaptive trip counter system executed by said signal processing circuitry which determines whether said trip command signal is initiated depending upon said value of said trip condition signal.

37. The protective relay of claim 36 wherein said adaptive trip counter system also determines whether a trip command signal should be delayed depending upon said value of said trip condition signal.

38. The protective relay of claim 37 wherein said limiter system limits the possible value of said trip condition signal to three possible values.

39. The protective relay of claim 38 wherein the three possible values are 0, 1 and 2.

40. The protective relay of claim 22 wherein the signal processing circuitry includes a microprocessor.

41. The protective relay of claim 22 wherein the signal processing circuitry includes a commercially available DSP.

42. The protective relay of claim 22 wherein the signal processing circuitry includes an A/D converter.

43. The protective relay of claim 22 wherein the signal processing circuitry includes analog circuitry.

44. The protective relay of claim 30 wherein the line input signal is a current signal.

45. The protective relay of claim 27 wherein said magnitude comparator processing system comparing the magnitudes of said operate signal and said restrain signal comprises subtracting the magnitude square of said operate signal adjusted for DC offset from the restrain signal squared.

46. The protective relay of claim 45 wherein the line input signal is a voltage signal.

47. A method for detecting abnormal line conditions in power transmission systems using a protective relay, the method comprising:

a. detecting at least one input signal;
  b. determining an operate signal and a restraint signal by processing at least one digitized version of said at least one line input signal;
  c. determining a trip condition signal by comparing the magnitudes of said operate signal and restraint signal, said trip condition representing the difference between said magnitudes;
  d. limiting the possible value of said trip condition signal to obtain a limited trip condition signal; and
  e. initiating a trip command signal depending upon the magnitude and sign of said limited trip condition signal.

48. The method of claim 47 wherein step e also comprises determining whether a trip command signal should be delayed depending upon said value of said limited trip condition signal.

49. The method of claim 47 wherein step c also comprises subtracting the magnitude square of the restraint signal from the magnitude square of the operate signal.

50. The method of claim 49 wherein step c also comprises computing the magnitude square of said operate signal by adding a squared signal orthogonal to said operate signal to said operate signal squared.

51. The method of claim 49 step a comprises detecting line voltage and current signals.

52. The method of claim 47 wherein step c also comprises subtracting the magnitude square of said operate signal adjusted for DC offset from the restraint signal squared.

53. The method of claim 52 wherein step a comprises detecting a line voltage signal.

54. The method of claim 47 wherein step c also comprises subtracting the restraint signal squared from the magnitude square of said operate signal adjusted for DC offset.

* * * * *

UNITED STATES PATENT AND TRADEMARK OFFICE
CERTIFICATE OF CORRECTION

PATENT NO. : 6,137,666
DATED : October 24, 2000
INVENTOR(S) : Liancheng Wang

It is certified that error appears in the above-identified patent and that said Letters Patent is hereby corrected as shown below:

Col. 6, line 29, "signal (k)" should read --signal $S_o(k)$--

Col. 8, line 5, "so(k)" should read --$s_o(k)$--

Col. 9, line 50, $s_1(t)$ should read $s_\perp(t)$

In the following equations, every occurence of "$s_1$" should read --$s_\perp$--:

Col. 9 -- Equation (8)
    Col. 9 -- Equation (9)
    Col. 10 -- Equation (12)

UNITED STATES PATENT AND TRADEMARK OFFICE
CERTIFICATE OF CORRECTION

PATENT NO. : 6,137,666
DATED : October 24, 2000
INVENTOR(S) : Liancheng Wang

It is certified that error appears in the above-identified patent and that said Letters Patent is hereby corrected as shown below:

In Col. 10, from lines 39 through 51, every occurrence of "$s_1$" should read --$s_\perp$--

Signed and Sealed this

Eighth Day of May, 2001

*Attest:*

NICHOLAS P. GODICI

*Attesting Officer*    Acting Director of the United States Patent and Trademark Office